United States Patent [19]

Kennedy et al.

[11] 4,213,620
[45] Jul. 22, 1980

[54] CYLINDER HEAD GASKET

[75] Inventors: Lawrence C. Kennedy, Birmingham; Joseph Kowalis, Plymouth, both of Mich.

[73] Assignee: General Motors Corporation, Detroit, Mich.

[21] Appl. No.: 971,361

[22] Filed: Dec. 20, 1978

[51] Int. Cl.[2] .................. F16J 15/06; F16J 15/12
[52] U.S. Cl. .................. 277/235 B; 277/166
[58] Field of Search ............ 277/166, 227, 229, 234, 277/235 R, 235 A, 235 B

[56] References Cited

U.S. PATENT DOCUMENTS

| | | | |
|---|---|---|---|
| 2,055,103 | 9/1936 | Hewitt | 277/235 B X |
| 2,753,199 | 7/1956 | Victor | 277/235 B X |
| 3,430,611 | 3/1969 | Belter | 277/235 B X |
| 3,567,234 | 3/1971 | Skrycki | 277/235 B X |
| 3,784,212 | 1/1974 | Doerfling | 277/235 B X |
| 3,957,279 | 5/1976 | Belter | 277/235 B |
| 4,121,846 | 10/1978 | Skrycki | 277/235 B X |

FOREIGN PATENT DOCUMENTS

| | | | |
|---|---|---|---|
| 1452723 | 8/1966 | France | 277/235 B |
| 954327 | 4/1964 | United Kingdom | 277/166 |
| 1278321 | 6/1972 | United Kingdom | 277/235 B |

Primary Examiner—Robert S. Ward, Jr.
Attorney, Agent, or Firm—Robert J. Outland

[57] ABSTRACT

A highly conformable cylinder head gasket, especially for diesel engines, in which a steel carrier plate has plural cylinder openings surrounded by raised high shear compression beads formed by partially shearing the metal more than 25 percent but not more than about 50 percent of the carrier plate thickness. The edges of the cylinder openings and the compression beads are covered by a stainless steel wrap of interconnected rings formed from a single sheet, while the edges of the gasket and other fluid conducting openings are sealed with a composition material applied to the carrier plate and having portions precompressed to leave a narrow non-precompressed sealing bead at the desired areas.

5 Claims, 5 Drawing Figures

U.S. Patent  Jul. 22, 1980  4,213,620
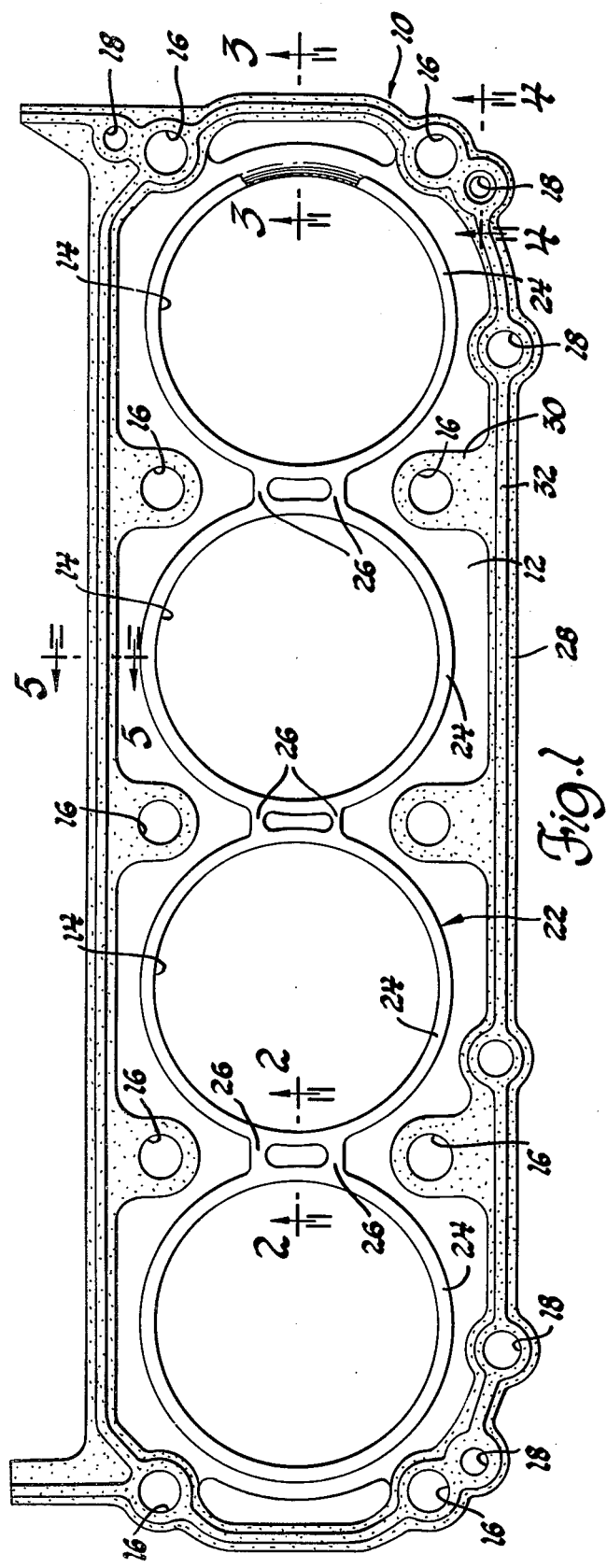

CYLINDER HEAD GASKET

TECHNICAL FIELD

This invention relates to gaskets and, more particularly, to close tolerance conformable cylinder head gaskes for use in internal combustion engines, particularly of the diesel type.

BACKGROUND OF THE INVENTION

Many types of engine cylinder head gaskets are disclosed in the prior are for use in sealing the cylinders and various other openings at the cylinder head and block interface of an internal combustion engine. Among the problems faced in applying prior art gasket designs to multi-cylinder engines of the diesel type is the difficulty of obtaining adequate sealing around the cylinders with reasonable clamping loads applied to the cylinder head using a gasket construction having reasonable manufacturing tolerances and capable of being applied between manufactured assemblies of cylinder blocks and cylinder heads having practical tolerance limits. In some prior gaskets, cylinder sealing has been accomplished in part by partially sheared beads embossed in a steel carrier plate and covered by a thin metal wrap. In other gasket constructions, non-metallic gasket materials utilized for sealing fluid passages other than engine cylinders have made use of percompression of some of the gasket material so as to leave raised non-precompressed beads of material available to seal at the desired areas.

SUMMARY OF THE INVENTION

The present invention provides an engine cylinder head gasket, especially for deisel engines, constituting an improvement over the concepts of the prior art and applicable particularly to multi-cylinder engines having cylinder blocks with freestanding cylinder bores or separate liners in which minor variations in height, and therefore clearance to the cylinder head, may exist.

To minimize manufacturing variations and simplify assembly, gaskets according to the present invention utilize a single carrier plate having openings for a plurality of adjacent cylinders in a single cylinder bank and provided with partially sheared compression beads around each of the cylinder openings. Dimensional tolerance variations are limited by forming all the beads simultaneously with a single shearing die.

The invention further provides a sheet metal cover wrap for the cylinder opening compression beads. The cover wrap is also formed from a single metal sheet, thus further limiting the tolerance stack up at the cylinder openings.

The invention may also provide a high shear of the steel compression bead embossments of more than 25 percent but not more than about 50 percent, a range which we have found is effective to substantially increase the conformability of the gasket without a corresponding increase in clamping loads. Such high shear also provides a degree of creep during initial engine operation which tends to balance the sealing load at the various cylinders and provide more uniform sealing.

In order to complete the sealing of various oil and water passages and provide a sealing bead around the periphery of the gasket, a non-metallic composition material may be applied to the edges of the carrier plate, portions of which are precompressed to leave raised non-precompressed sealing beads at the desired locations. In this way, sealing of the desired areas is accomplished with a minimum effect upon the distribution of the main clamping load to the sealing of the cylinders.

These and other features and advantages of the present invention will be more fully understood from the following description of a preferred embodiment taken together with the accompanying drawing.

BRIEF DESCRIPTION OF THE DRAWING

In the drawing:

FIG. 1 is a plan view of an engine cylinder head gasket formed according to the invention;

FIGS. 2, 3, 4, and 5 are enlarged cross-sectional views showing portions of the gasket of FIG. 1 taken in the planes indicated by the lines 2—2, 3—3, 4—4 and 5—5, respectively.

BEST MODE FOR CARRYING OUT THE INVENTION

Referring now to the drawing in detail, numeral 10 generally indicates an engine cylinder head gasket formed according to the invention. Gasket 10 includes a sheet metal carrier plate 12 of appropriate material and thickness for the particular application, which, in the present example, is steel sheet of about 0.6 millimetres. Plate 12 is provided with a plurality of aligned cylinder openings 14 spaced from one another in the central portion of the gasket. Around its periphrey, the plate is further provided with numerous bolt openings 16 and various other openings 18 for oil and water passages in the associated engine.

Around each of the cylinder openings 14, the carrier plate is preferably provided with a high shear embossment in the form of a narrow partially sheared bead 20 formed by displacing part of the material of the carrier plate with a shearing die an amount which is more than 25 percent but not greater than about 50 percent of the thickness of the carrier plate itself, as measured at the point of shear. A low shear embossment of not more than 25 percent shear may also be used if desired. In either case, the individual raised beads 20 of the various cylinders are formed by a single shearing die so that differences in height between the various beads of a single gasket are minimized.

Both faces of the partially sheared bead of each cylinder opening are covered by a wrap 22 of sheet metal of suitable material and thickness, in the present example stainless steel of about 0.5 millimeters, and formed as a plurality of rings 24 around the interior and along the periphery of each of the cylinder openings. Each of the individual rings 24 is joined to the others by connecting bridges 26 located on one side of the carrier plate so that the individual rings of the cover are retained together in a unit formed from a single sheet with the resultant minimizing of differences in thickness of the various wrapping rings for each cylinder opening.

Around the periphery of the carrier plate outwardly of the sheet metal wrap 22, a composition gasket material 28 of any suitable type is cemented or otherwise applied to both surfaces of the carrier plate, extending around the complete periphery of the plate and all its various bolt and other openings 16, 18. In order to prevent this portion of the gasket material from absorbing a greater than necessary portion of the total clamp load applied to the gasket in assembly, large portions of the composition gasket material 28 are precompressed as at 30, leaving, however, selected unprecompressed portions in the form of raised beads 32 along both sides of the gasket and extending completely around the periphery thereof, as well as around some of the bolt openings 16 and all of the other fluid passage openings 18 so as to provide positive sealing of these passages and the gasket periphery.

As a result of the construction heretofore described, there is provided a novel, close tolerance, conformable diesel engine cylinder head gasket having excellent sealing of cylinder openings, in spite of substantial tolerance variations in the clearance between the components to be sealed, and further providing supplemental sealing of fluid passage openings and the gasket periphery without unduly detracting from the clamp load applied to the main cylinder openings. The provision of the high shear embossment of more than 25 percent but not greater than 50 percent of the thickness of the gasket plate by which the cylinder sealing beads 20 are formed around the cylinder openings is particularly effective in providing equalization of loading on the various cylinders in spite of tolerance variations between them. A creep factor effective during initial engine run-in is also present with this design which aids in equalizing cylinder sealing forces acting at the individual cylinder openings, thus providing an extended life to the overall gasket assembly.

While the invention has been described by reference to a particular embodiment, it should be understood that numerous changes might be made within the scope of the inventive comcepts disclosed. Accordingly, the invention is not intended to be limited to the disclosed embodiment but to have the full scope permitted by the language of the following claims.

The embodiments of the invention in which an exclusive property or privilege is claimed are defined as follows:

1. A close tolerance conformable cylinder head gasket for use between the cylinder head and block of an internal combustion engine, said gasket comprising
    a single sheet metal carrier plate of essentially uniform thickness and having a plurality of spaced cylinder openings,
    a partly sheared annular embossment surrounding each of said cylinder openings closely adjacent the edges thereof, said embossments comprising annular portions of the carrier plate material partly displaced by shearing from the plane of the adjacent body of the plate,
    said cylinder openings having a metallic cover wrap enclosing their edges and both faces of the adjacent embossments, said wrap comprising interconnected rings formed from a single metal sheet of essentially uniform thickness,
    said wrap cooperating with said opening-defining plate edges and their adjacent embossments to provide close tolerance conformable metallic sealing means for each of the cylinder openings.

2. A cylinder head gasket as defined in claim 1 and further comprising
    additional spaced openings in said carrier plate for fluid passages and the like, and
    compressible non-metallic sealing means on both sides of said carrier plate outwardly of said metallic sealing means, said non-metallic sealing means being coextensive with the periphery of said carrier plate and surrounding at least some of said additional spaced openings independently of said metallic sealing means.

3. A cylinder head gasket as defined in either of claims 1 or 2 wherein said annular embossments are formed simultaneously by a single shearing die to limit dimensional variations between them.

4. A close tolerance, highly conformable cylinder head gasket for use between the cylinder head and block of an internal combustion engine, said gasket comprising
    a single sheet metal carrier plate of essentially uniform thickness and having a plurality of spaced cylinder openings,
    a partly sheared annular embossment surrounding each of said cylinder openings closely adjacent the edges thereof, said embossments comprising annular portions of the carrier plate material partly displaced by shearing from the plane of the adjacent body of the plate by over 25 percent but not more than about 50 percent of the plate thickness,
    said cylinder openings having a metallic cover wrap enclosing their edges and both faces of the adjacent embossments, said wrap comprising interconnected rings formed from a single metal sheet of essentially uniform thickness,
    said wrap cooperating with said opening-defining plate edges and their adjacent embossments to provide high conformability metallic sealing means for each of the cylinder openings.

5. A highly conformable cylinder head gasket for use between the cylinder head and block of an internal combustion engine, said gasket comprising
    a single sheet metal carrier plate of essentially uniform thickness and having a plurality of spaced cylinder openings as well as additional spaced openings for fluid passages, head bolts and the like,
    a partly sheared annular embossment surrounding each of said cylinder openings closely adjacent the edges thereof, said embossments comprising annular portions of the carrier plate material partly displaced by shearing from the plane of the adjacent body of the plate by over 25 percent but not more than about 50 percent of the plate thickness,
    said cylinder openings having a metallic cover wrap enclosing their edges and both faces of the adjacent embossments, said wrap comprising interconnected rings formed from a single metal sheet of essentially uniform thickness,
    said wrap cooperating with said opening-defining plate edges and their adjacent embossments to provide high conformability metallic sealing means for each of the cylinder openings, and
    compressible non-metallic sealing means spaced outwardly of said metallic sealing means and covering both sides of said carrier plate along its periphery, said non-metallic sealing means having portions thereof precompressed and other portions non-precompressed to define raised beads of non-precompressed material extending along the periphery of said head gasket and surrounding at least some of said additional spaced openings to provide high conformability non-metallic sealing means for said at least some openings and for said gasket periphery.

* * * * *